United States Patent
Ohno et al.

(10) Patent No.: US 10,085,461 B2
(45) Date of Patent: Oct. 2, 2018

(54) ELECTRICAL FIELD APPLICATION METHOD

(71) Applicant: MARS COMPANY, Gunma (JP)

(72) Inventors: Masaki Ohno, Gunma (JP); Motohiko Sato, Tokyo (JP); Tadao Izutsu, Kanagawa (JP)

(73) Assignee: MARS COMPANY, Gunma (JP)

(*) Notice: Subject to any disclaimer, the term of this patent is extended or adjusted under 35 U.S.C. 154(b) by 0 days.

(21) Appl. No.: 14/652,336

(22) PCT Filed: Dec. 16, 2013

(86) PCT No.: PCT/JP2013/083573
§ 371 (c)(1),
(2) Date: Jun. 15, 2015

(87) PCT Pub. No.: WO2014/098009
PCT Pub. Date: Jun. 26, 2014

(65) Prior Publication Data
US 2015/0327561 A1 Nov. 19, 2015

(30) Foreign Application Priority Data
Dec. 18, 2012 (JP) .................. 2012-275359

(51) Int. Cl.
*A23L 1/30* (2006.01)
*A23B 4/015* (2006.01)
(Continued)

(52) U.S. Cl.
CPC .............. *A23B 4/015* (2013.01); *A23B 7/015* (2013.01); *A23L 3/32* (2013.01); *A23L 5/30* (2016.08);
(Continued)

(58) Field of Classification Search
None
See application file for complete search history.

(56) References Cited

U.S. PATENT DOCUMENTS 4,457,221 A * 7/1984 Geren .................. A23L 3/32
204/194
5,607,613 A * 3/1997 Reznik .................. A23B 5/01
219/771
(Continued)

FOREIGN PATENT DOCUMENTS

JP 03-098565 4/1991
JP 2001-190444 7/2001
(Continued)

OTHER PUBLICATIONS

Van Oord: WO2011139144; published Nov. 10, 2011.*
(Continued)

*Primary Examiner* — Patricia A George
(74) *Attorney, Agent, or Firm* — Young & Thompson

(57) ABSTRACT

The present invention not only forms an electric field environment that can be controlled to differentiate between preservation of food freshness and promotion of ripening but also promotes fermentation by fermentative microbes, propagates plankton and inhibits bacterial reproduction. An electrode plate 2 is set inside a refrigerator 1 or an adjustable temperature box 6. Food 3 or a yogurt container 9 is place thereon. The electrode plate 2, 10 is connected to a power source 4, 11. Selection between food freshness preservation and promotion of ripening, and promotion of fermentation of fermented foods such as yogurt are performed by rectification, and voltage and frequency control of the power source. Additionally, propagation of phytoplankton and inhibition of bacterial reproduction are performed by controlling the frequency, voltage and ON/OFF timing of the power source.

1 Claim, 4 Drawing Sheets

(51) Int. Cl.
*A23L 3/32* (2006.01)
*A23B 7/015* (2006.01)
*A23L 5/30* (2016.01)

(52) U.S. Cl.
CPC ....... *A23V 2002/00* (2013.01); *A23Y 2220/00* (2013.01)

(56) References Cited

U.S. PATENT DOCUMENTS

| | | | | |
|---|---|---|---|---|
| 5,889,646 | A * | 3/1999 | Strauss | F25D 11/022 361/153 |
| 6,093,432 | A * | 7/2000 | Mittal | A23C 3/00 422/186.04 |
| 8,076,620 | B2 * | 12/2011 | Maupin | A47J 27/004 219/432 |
| 2002/0119218 | A1 * | 8/2002 | Burke, Jr. | A22C 29/043 426/24 |
| 2006/0233925 | A1 * | 10/2006 | Kawamura | F25D 11/00 426/237 |
| 2010/0145546 | A1 * | 6/2010 | Yoo | F25B 49/025 700/298 |

FOREIGN PATENT DOCUMENTS

| | | |
|---|---|---|
| JP | 2001-204428 | 7/2001 |
| JP | 2005-156042 | 6/2005 |
| JP | 2008-164219 | 7/2008 |
| JP | 2012-200327 | 10/2012 |
| WO | WO98/41115 | 9/1998 |

OTHER PUBLICATIONS

International Search Report, PCT/JP2013/083573, dated Mar. 18, 2014.
Watanabe, Y., et al., Effect of D.C. Voltage Application on Ethanol Fermentation, 2011, Electrical Insulation and Dielectric Phenomena (CEIDP), 2011 Annual Report Conference on, p. 175-178.
Marselles-Fontanet, Ar., et al., Optimising the inactivation of grape juice spoilage organisms by pulse electric fields, 2009, International Journal of Food Microbiology, vol. 130, p. 159-165.
Muramatsu N et al.: Analytical Techniques; Firmness; Fruits; Ripening; Texture; Vibration, Journal Article, Apr. 19, 1994, ISSN 0925-5214, vol. 15, XP-002758341.
Metallurgy: Asymmetric Electric Filed Apply Device Maintain Fresh Food Item Electrode Waveform Type Alternate Postive Negative Intensity Value Generate, Dec. 26, 2006, ISSN 0925-5214, XP-002758342.
Terasaki S et al.: Ripening Degree Measure Method Vegetable Tomato Fruit Apple Kiwi Accord Phase Differ Sine Wave Oscillating Apply Detect Surface—Sep. 9, 1996, XP-002758343.

* cited by examiner

ELECTRICAL FIELD APPLICATION METHOD

TECHNICAL FIELD

The present invention relates to an electrical field application method of applying an electrical field for maturing food, preserving freshness thereof, causing food to ferment, etc.

BACKGROUND OF THE INVENTION

In general, it is known to apply a high voltage to food and to put the food in an electrical field atmosphere for preserving freshness of the food or facilitating a maturing processing of the food. Such the electrical field atmosphere is formed by an electric power source having a voltage of from 2 kV to 10 kV and a commercial electric power source frequency (50 or 60 Hz). When conducting a freshness preservation processing or a maturing processing of food, the inside of a refrigerator is kept at a temperature of from 0 to −2° C., and the electrical field atmosphere is formed by the above-mentioned electric power source merely. In addition, it is also known that the electrical field has a function of inhibiting growth of bacterium attached to food and that the electrical field is applied to fermented beverage.

PRIOR ART DOCUMENT

Patent Document

[Patent Document 1] Japanese Patent Provisional Publication No. 2001-204428
[Patent Document 2] PCT International Application No. WO98/41115
[Patent Document 3] Japanese Patent Provisional Publication No. 2005-156042
[Patent Document 4] Japanese Patent Provisional Publication No. 2001-190444

SUMMARY OF THE INVENTION

Subject to be Solved by the Invention

However, the above-mentioned Patent Documents 1 and 2 use the same electrical field application method without making differentiation between the freshness preservation of the food and the facilitation of the maturing processing of the food, and the main purpose of applying the electrical field is not clear as to whether for the freshness preservation or the facilitation of the maturing processing. In addition, the above-mentioned Patent Document 3 discloses application of the electrical field to *lactobacillus* beverage, but neither discloses that the application of the electrical field has a function of facilitating fermentation, nor any specific application method for that. Further, in the above-mentioned Patent Document 4, there has not been taken a sufficient consideration of how the electrical field is applied to enhance a growth inhabitation effect of the bacterium.

Means to Solve the Subject

Hence, the electrical field application method of the first invention comprises the steps of: rectifying, when placing food such as livestock meat, fish meat, chicken meat, vegetable, fruit, etc. in an electrical field atmosphere to execute a freshness preservation processing or a maturing processing, a sine wave of an electric power source by which an electrical field is to be formed in the food, to conduct a positive (+) wave rectification that provides a positive (+) wave component and a negative (−) wave rectification that provides a negative (−) wave component, and applying, in case of the freshness preservation processing, a negative rectified wave to the food, or in case of the maturing processing, a positive rectified wave to the food.

In addition, the electrical field application method of the second invention comprises the step of: applying an electrical field having a voltage larger than 100 V and a frequency of 50 Hz or more to fermentation micro-organism such as *lactobacillus* of yogurt, *Bacillus subtilis* derived from rice bran, etc., thus facilitating fermentation.

Further, the electrical field application method of the third invention comprises the step of: applying an electrical field having a voltage larger than 100 V and a frequency of 50 Hz or more to phytoplankton, thus providing increase in number thereof and growth thereof.

Further, the electrical field application method of the fourth invention comprises the step of: applying intermittently an electrical field to bacterium attached to food, such as viable bacterium, staphylococcal bacterium, etc., thus inhibiting growth of the bacterium.

Function of the Invention

An application of a half-wave rectification or a full-wave rectification in which a positive (+) wave component has been rectified by rectifying a sine wave, to food, can facilitate the maturing process of meat, fish and vegetable (Korean pickle, etc.), and an application of a half-wave rectification or a full-wave rectification in which a negative (−) wave component has been rectified, to food, can facilitate a freshness preservation processing of such as meat, fish and vegetables, thus permitting a selective control of the electric power source, depending on the purpose.

An electric power source having a larger frequency than a commercial electric power source (50, 60 Hz) and a larger voltage than 100 V may cause an increase in the activity of fermentation micro-organism such as *lactobacillus* of yogurt, *Bacillus subtilis* derived from rice bran, etc., thus making it possible to manufacture fermented food having a pleasant taste such as yogurt, pickled vegetable, Korean pickle, dried fish (Kusaya in Japanese), salted fish guts (Shiokara in Japanese), etc.

In addition, concerning phytoplankton, use of the same electric power source as in the fermentation micro-organism may cause an increase in the activity of phytoplankton to facilitate a photosynthesis reaction, with the result that the phytoplankton may be cultivated in low illumination in a plant factory, and it may contribute to cultivation of fish.

In addition, an intermittent application of an electrical field to bacterium attached to food to produce a physical effect, such as viable bacterium, staphylococcal bacterium, etc., at predetermined time intervals may slow down ability of the bacterium to adopt to environment, thus permitting to inhibit growth of the bacterium.

EMBODIMENTS FOR CARRYING OUT THE INVENTION

Now, embodiments of the present invention will be described below with reference to the drawings.

It is known, as an art to preserve freshness of food such as livestock meat, fish meat, vegetable, etc., thaw the frozen thereof, or mature the food, to insulate the food electrically and apply a high voltage (1 kV~7 kV) through an electrode to the food. Besides thaw with a smaller amount of drip, the preservation of freshness and the maturing facilitation may apparently-contradictory in effect to each other, but it has been known that application of an alternating current sine wave to food would provide both effects in a balanced manner.

Figure 1:
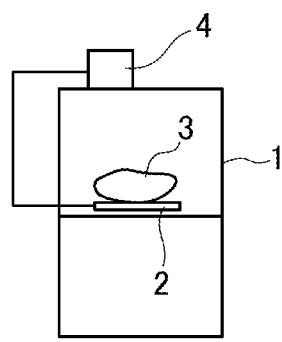
FIG. 1 is a descriptive view of a state of application of an electrical field.
Figure 2:
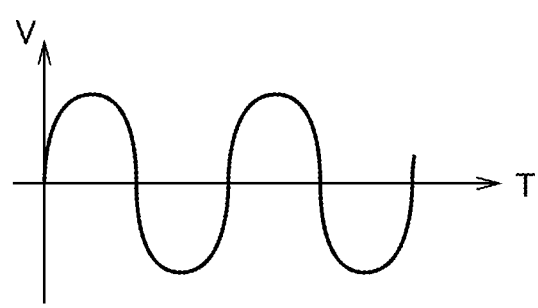
FIG. 2 is a waveform diagram of an alternating current sine wave of an electric power source.
Figure 3:
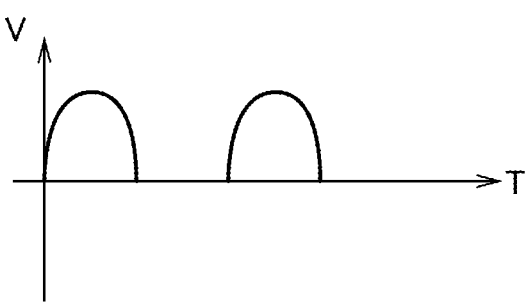
FIG. 3 is a waveform diagram of a positive (+) half-wave rectification.
Figure 4:
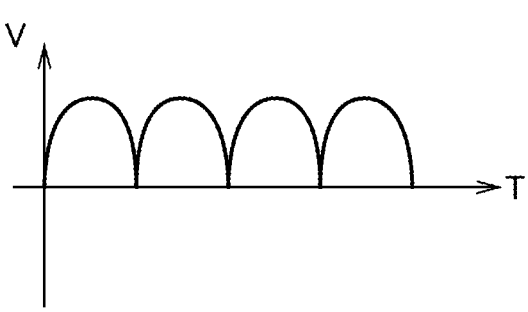
FIG. 4 is a waveform diagram of a positive (+) full-wave rectification.
Figure 5:
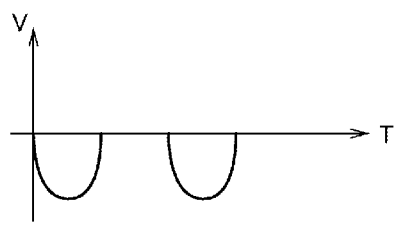
FIG. 5 is a wave form diagram of a negative (−) half-wave rectification.
Figure 6:
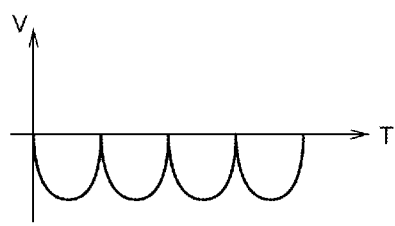
FIG. 6 is a wave form diagram of a negative (−) full-wave rectification.

An electrical field processing of livestock meat, fish meat, vegetable, etc. is constituted by providing an electrode plate 2 in a refrigerator 1, placing food 3 on this electrode plate 2 in an insulated state, and connecting an electric power source 4 to the above-mentioned electrode plate 2, so as to apply a voltage (1~5 kV) of an alternating current sine wave (FIG. 2) from this electric power source 4, as generally shown in FIG. 1. Such an application of the voltage of the sine wave can provide the effects of freshness preservation and maturing facilitation of the food in a balanced manner. However, application of voltage of a positive (+; plus) half-wave rectification as shown in FIG. 3, or voltage of a waveform of a full-wave rectification in which positive components continues as shown in FIG. 4 can remarkably facilitate the maturing effect, and conversely application of voltage of a negative (−; minus) half-wave wave rectification as shown in FIG. 5, or voltage of a waveform of a full-wave rectification in which negative components continues as shown in FIG. 6 can remarkably facilitate the freshness preservation effect.

Figure 10:
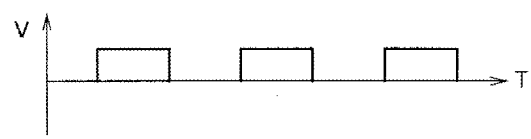
FIG. 10 is a waveform diagram of a triangle wave rectification.
Figure 11:
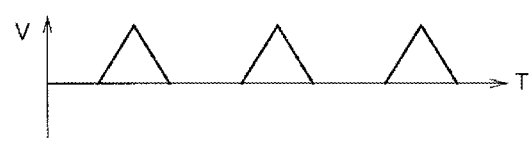
FIG. 11 is a waveform diagram of a pulse wave rectification.
Figure 12:
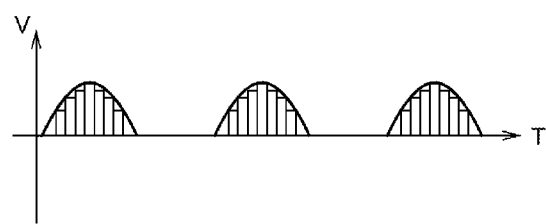
FIG. 12 is a waveform diagram of rectification in which pulse waves are gathered to form a sine waveform.

Concerning the waveform, the positive or negative component of a pulse waveform as shown in FIG. 10 or a triangle waveform as shown in FIG. 11 may be used for any purpose, and there may be used a waveform in which the positive or negative component of the sine wave is formed of a combined body of pulse waves as shown in FIG. 12.

1) First Experimental Example (Selective Waveform Control)

A sine wave, a positive half-wave rectification and a negative half-wave rectification were applied to livestock meat and fish meat placed in a refrigerator. The results are shown in Table 1.

| Experiment Conditions | Temperature of Refrigerator | −1° C. |
| | Humidity of Refrigerator | 30~50% |
| | Electric Power Source | 50 Hz, 5 kV |
| | Period of time | five days |
| Assessment | Freshness preservation | Visual contact |
| | Maturing | amino acid content |

TABLE 1

| | Freshness preservation | Maturing (Amino acid) |
| --- | --- | --- |
| Sine wave | ◯ | ◯ |
| Positive (+) half-wave rectification | Δ | ◎ |
| Negative (−) half-wave rectification | ◎ | Δ |

Wherein, Δ denotes slightly no good, ◯, good, and ◎, excellent.

It is revealed from these results that the sine wave provides the effects of freshness preservation and maturing facilitation in a balanced manner, the positive half-wave rectification provides the excellent maturing facilitation effect, but provides slightly no good freshness preservation effect, and the negative half-wave rectification provides the excellent freshness preservation effect, but provides slightly no good maturing facilitation effect. Therefore, the waveform may be selected for any purposes.

In addition, the electrical field atmosphere activates fermentation micro-organism such as *lactobacillus, Bacillus subsilis*, etc., which makes food tasty. Its effects depend on a frequency and a voltage, and the results are indicated in Table 2 and Table 3.

2) Second Experimental Example (Facilitation of Fermentation)

| Experiment Conditions | |
| --- | --- |
| Kind of Bacteria | *Bacillus subtilis* derived from rice bran (*Bacillus* species) |
| Temperature | 40° C. |
| Humidity | 50% |
| Electric Power Source | |
| Frequency | 50 Hz, 300 Hz |
| Voltage | 5 kV |
| Waveform | Sine wave |
| Fermentation material | Defatted soybean |
| Start Temperature | 40° C. |

TABLE 2

| | | Control Region (without electrical field) | Electrical field (50 Hz, 5 kV) | Electrical field (300 Hz, 5 kV) |
| --- | --- | --- | --- | --- |
| Results | Peak temperature of Fermentation heat | 52 degrees | 55 degrees | 57 degrees |
| | Required time the fermentation heat reaches to peak | 20 hours | 18 hours | 16.5 hours |

It is revealed from Table 2 that 20 hours were required, without electrical field, until the defatted soybean as the fermentation material fermented and its fermentation heat reached the peak temperature of 52° C. from 40° C., and increase in frequency and voltage not only increased the peak temperature of the fermentation heat to 57° C., but also reduced the time required for the fermentation heat to reach the peak temperature to 16.5 hours. It is considered that the electrical field having a high voltage and a high frequency may activate ferment of microorganism, and facilitate a biochemical reaction of oxidation-reduction in the body of microorganism.

3) Third Experimental Example (Facilitation of Fermentation)

Figure 7:
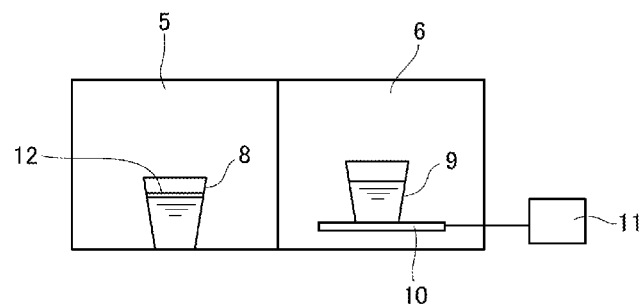
FIG. 7 is a chart of an experiment system of facilitation of fermentation of *lactobacillus* of yogurt.

As shown in FIG. 7, there were prepared two boxes in which a temperature and humidity therein were controllable, containers 8 and 9 were placed in them, respectively. An electrode plate 10 was placed in the box 6, an electric power source 11 was connected to the electrode plate 10, and the box 6 served as a control region and the box 6 served as an electrical field region. The above-mentioned containers 8, 9 were made of polypropylene and had the volume of 236 cc. 200 cc of whole milk (at least 8.3% nonfat milk solid, at least 3.5% milk fat, and 100% raw milk) and 15 cc of LB81 *lactobacillus* (Meiji Bulgaria Yogurt) or bifidobacteria were put in these containers to cause the bacteria to ferment. The results are shown in Table 3.

| Experiment Conditions | |
|---|---|
| Kind of Bacteria | LB81 *lactobacillus* (Meiji Bulgaria Yogurt) |
| Temperature | 25° C. (A lower temperature was set for comparison purpose, although a temperature at which yogurt was normally prepared was 40° C.) |
| Humidity | 45~50% |
| Electric Power Source | 50 Hz, 1.0~2.0 mA, 5 kV, Sine wave |
| Application period of time | 24 hours |

TABLE 3

| | Control Region | Electrical Field Region |
|---|---|---|
| Hardness | Soft (Between drinkable yogurt and normal yogurt) | Hard (Normal yogurt) |
| Free water | Existence | No existence |
| Feeling on tongue | Coarse | Fine (feel like silk) |
| Acerbity | Normal | Soft |

As is clear from the results of Table 3, the electrical field region provided the same results as in LB81 *lactobacillus* and bifidobacteria, and activation of the fermentation microorganism was facilitated so that the raw milk became almost normal yogurt for 24 hours. In the control region without electrical field, there was observed a free-water section 12 on the surface of which water floated, but such a section was not at all observed in the electrical field region, and the resultant was fine and not strongly sour, thus providing a soft feeling.

4) Forth Experimental Example (Growth of Phytoplankton)

Based on the fact of the electrical field atmosphere activating phytoplankton, 0.5% cooking water of clam and freshwater chlorella were added to fresh water and the resultant was exposed to light having an illuminance of 450 LUX for a period of one month, to grow the phytoplankton. The results are shown in Table 4.

| Experiment Conditions | |
|---|---|
| Kind of water | Freshwater |
| Phytoplankton | Freshwater *chlorella* |
| Culture solution (cooking water of clam) concentration | 0.5% |
| Illuminance | 450 LUX |
| Temperature | 28° C. |
| Growth period of time | one month |
| Electric Power Source | 50 Hz, 300 Hz, 5 kV, Sine wave |

TABLE 4

| | | Control Region (without electrical field) | Electrical field (50 Hz, 5000 V) | Electrical field (300 Hz, 5000 V) |
|---|---|---|---|---|
| Results | Initial density of phytoplankton | 200/ml | 200/ml | 200/ml |
| | Final density of phytoplankton | 280/ml | 620/ml | 740/ml |

As is clear from the results of Table 4, the electrical field grew the phytoplankton, and the higher voltage than 100 V and the higher frequency than a normal frequency of 50 Hz could provide a remarkable activation effect. Photon is required for a photosynthesis reaction of the phytoplankton. The photon energy is low at a low illuminance, resulting in little progress of the photosynthesis reaction. However, application of the electrical field (electron) would lower a threshold of energy required for the photosynthesis reaction, and a relatively low illuminance may facilitate the photosynthesis reaction. This makes it possible to decrease the illuminance at a plant factory, thus leading to energy conservation.

5) Fifth Experimental Example (Inhibition of Growth of Bacterium)

Figure 8:
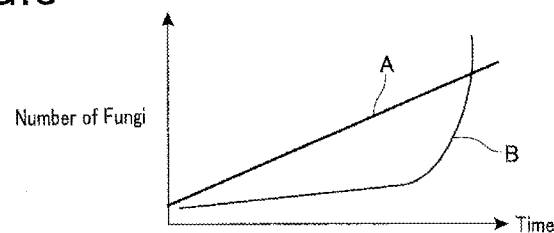
FIG. 8 is a comparative graph in growth of bacteria between an electrical field and a non-electrical field.

Bacterium, which is to be generally attached to food, such as viable bacterium, *Bacillus coli*, staphylococcal bacterium, etc., may increase, without an electrical field, at a constant rate as time proceeds, as shown in a straight line A in FIG. 8. In case of continuously applying the electrical field, there is a tendency that an increase rate is low as shown in a curved line B until a predetermined period of time lapses, but then, the bacterium may get familiar with the environment and rapidly increase, resulting in a more rapid growth in comparison with a case where no electrical field is applied. Therefore, it is possible to inhibit the latest growth of the bacterium by changing the environment to blunt the environmental responsiveness of the bacterium, before it gets familiar with the environment of the electric field.

So, the bacteria such as viable bacterium, *Bacillus coli*, staphylococcal bacterium, etc., were cultivated in Petri dishes as placed in a refrigerator, and the bacteria were subjected to an alternate process in which an electrical field-ON-step and an electrical field-OFF-step were repeated every 15 minutes, for a period of 72 hours, and then a total number of bacteria in the Petri dishes was counted with the use of a microscope. The inhibiting effects of bacteria growth are shown in Table 5.

| Experiment Conditions | |
|---|---|
| Refrigerator temperature | 0° C. |
| Electric Power Source | 50 Hz, 5 kV, Sine wave |
| | ON-OFF control every 15 minutes |
| Application period of time | 72 hours |

TABLE 5

| | Number of viable bacterium | *Bacillus coli* group | Staphylococcal bacterium |
|---|---|---|---|
| Application timing control made | 0/g | Negative/0.1 g | Negative/0.01 g |
| Application timing control not made | 5300/g | Negative/0.1 g | 5/0.01 g |

Figure 9:
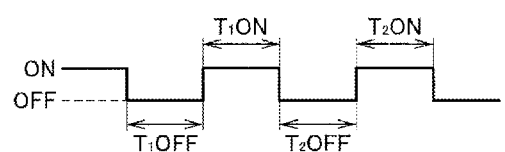
FIG. 9 is a description view of timing of applying an electrical field.

It is revealed from Table 5 that, for the viable bacterium, the application timing control by which the electrical field is applied intermittently provided remarkable effects of inhibiting the growth of the bacterium in comparison with the case where such an application timing control was not made, but there was no difference, for *Bacillus* coil. For staphylococcal bacterium, the application timing control provided a slightly good effect in comparison with the case where such an application timing control was not made. Incidentally, concerning the intermittent ON/OFF timing control, the environmental responsiveness of the bacterium may be remarkably blunted by appropriately changing the time intervals $T_{1ON}$ and $T_{2ON}$ for the ON step and the time intervals $T_{1OFF}$ and $T_{2OFF}$ for the OFF step, as shown in FIG. 9.

INDUSTRIAL APPLICABILITY

The present invention is applicable to a field of preserving freshness of livestock meat and fish, a fermentation field in which *lactobacillus* is utilized, a cultivation industrial field of fish and seafood, etc.

DESCRIPTION OF REFERENCE NUMERALS

1 - - - refrigerator
2 - - - electrode plate
3 - - - food
4 - - - electric power source
8 - - - container
9 - - - container
11 - - - electric power source
12 - - - free-water section

What is claimed is:
1. A method of applying an electrical field for food preservation, comprising:
   i. a first applying, consisting of: repeatedly applying only a rectified negative AC half sine wave to food on an electrode plate in a refrigerator for freshness preservation at 0 to −2° C.; and
   ii. a second applying, consisting of: repeatedly applying only a positive AC half sine wave, of a different polarity, to the food on an electrode plate in a refrigerator,
   wherein the food is at least one selected from the group consisting of fish, chicken, vegetables, fruit, and meat from livestock.

* * * * *